Patented Aug. 5, 1924.

1,504,134

UNITED STATES PATENT OFFICE.

WILHELM NEELMEIER AND KARL HEUSNER, OF LEVERKUSEN, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

DISAZO DYE.

No Drawing.  Application filed April 14, 1923. Serial No. 632,131.

*To all whom it may concern:*

Be it known that we, WILHELM NEELMEIER and KARL HEUSNER, citizens of Germany, residing at Leverkusen, near Cologne-on-the-Rhine, von Böttingerstrasse 19 and Karl Rumpfstrasse 25, in the State of Prussia, Germany, have invented new and useful Improvements in a Disazo Dye, of which the following is a specification.

It has been found that valuable disazodyes can be obtained by combining the diazo-compounds of monoacidyldiaminophenolethers (OR:$NH_2$:NH acidyl=1:5:2) with a middle component of the naphthelene series, e. g. 1-naphthylamine-6- or 7-sulfonic acid or a mixture thereof, 1.2-aminonaphthol-alkylether-6-sulfonic acid, rediazotizing, combining the aminoazocompounds with a naphthol sulfonic acid, e. g. 1-naphthol-3- or 4- or 2-naphthol-6- or 7-sulfonic acid and splitting off the acidyl radicle.

The new dyes are after being dried and pulverized in the shape of their alkali metal salts blackish powders soluble in water generally with a bluish coloration and in concentrated sulfuric acid generally with a green to blue coloration. Upon treatment with stannous chlorid and hydrochloric acid the new dyes are split up into a 2.5-diamino-1-phenolalkylether, a naphthylene diamine compound and an aminonaphthol sulfonic acid. They dye cotton blue shades which can be diazotized on fibre and developed with sodium-beta-naphtholate. Shades of excellent clearness and very good fastness to washing are thus obtained, a clear white is obtained when discharging with hydrosulfite.

In order to illustrate the new process more fully the following example is given, the parts being by weight:—

180 parts of 5-amino-2-acetylamino-1-anisol are dissolved in 5000 parts of water and 250 parts of hydrochloric acid (19° Bé.) and diazotized with 69 parts of sodium nitrite. The resulting diazocompound is added to a solution of 275 parts of 1-amino-2-naphtholmethylether-6-sulfonate of sodium to which 250 parts of sodium acetate (100%) have been added. After some hours the combination is complete. Subsequently the mixture is rendered acid with hydrochloric acid and the aminoazodye is diazotized with 69 parts of sodium nitrite. The diazocompound is then introduced at about zero into a solution of 246 parts of 1-naphthol-4-sulfonate of sodium in water and 700 parts of carbonate of sodium. The dye is filtered off, stirred up with 7000 parts of hot water and boiled during a quarter of an hour with 1400 parts of a 30 per cent caustic soda lye. After cooling the solution is neutralized with hydrochloric acid and the dye is filtered off. It has after being dried and pulverized in a free state most probably the following formula:

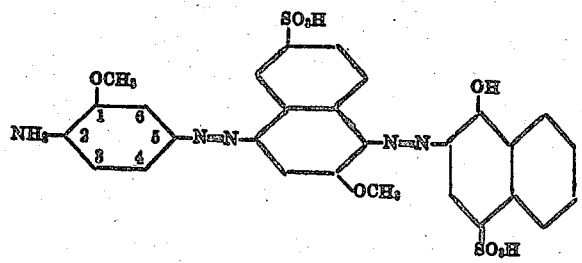

It is after being dried and pulverized in the shape of its sodium salt a black powder soluble in water with a greenish-blue and in concentrated sulfuric acid with a blue coloration. Upon treatment with stannous chlorid and hydrochloric acid it is split up into 2.5-diaminoanisol, 1.4-diamino-2-naphthol-methylether-6-sulfonic acid and 2-amino-1-naphthol-4-sulfonic acid. It dyes cotton blue shades and gives a greenish-blue fast to washing and to light on being diazotized and developed with sodium naphtholate. A clear white is obtained when discharging it with hydrosulfite.

We claim:—

1. The herein described new azodyes obtainable by combining the diazocompounds of a monoacidyldiaminophenolether with a middle component of the naphthalene series, rediazotizing and combining the resulting aminoazocompound with a naphthol sulfonic acid, which dyes are after being dried and pulverized in the shape of their alkali metal salts blackish powders soluble in water generally with a bluish colorization and in concentrated sulfuric acid generally with a green to blue coloration; being split up by treatment with stannous chlorid and hydrochloric acid into 2.5-diamino-1-phenol-alkylether, a naphthylenediamine compound and an aminonaphthol sulfonic acid; dyeing cotton blue shades which can be diazotized on fibre and developed with sodium-beta-naphtholate, substantially as described.

2. The herein described new azodye obtainable by combining the diazocompound of 5-amino-2-acetylamino-1-anisol with 1-amino - 2 - naphtholmethylether - 6 - sulfonic acid, rediazotizing, combining with 1-naphthol-4-sulfonic acid and splitting off the acetyl group, which dye is after being dried and pulverized in the shape of its sodium salt a black powder soluble in water with a greenish-blue and in concentrated sulfuric acid with a blue coloration; being split up upon treatment with stannous chlorid and hydrochloric acid into 2.5-diaminoanisol, 1.4 - diamino - 2 - naphtholmethylether-6-sulfonic acid and 2-amino-1-naphthol-4-sulfonic acid; dyeing cotton blue shades giving a greenish-blue fast to washing and to light on being diazotized and developed with sodium naphtholate, substantially as described.

In testimony whereof we have hereunto set our hands.

WILHELM NEELMEIER.
KARL HEUSNER.